(12) United States Patent
Crawford et al.

(10) Patent No.: US 10,394,483 B2
(45) Date of Patent: Aug. 27, 2019

(54) TARGET VOLUME SHADOW COPY

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 15/362,575

(22) Filed: Nov. 28, 2016

(65) Prior Publication Data
US 2018/0150228 A1  May 31, 2018

(51) Int. Cl.
*G06F 3/06* (2006.01)

(52) U.S. Cl.
CPC ........... *G06F 3/065* (2013.01); *G06F 3/067* (2013.01); *G06F 3/0619* (2013.01); *G06F 3/0644* (2013.01)

(58) Field of Classification Search
None
See application file for complete search history.

(56) References Cited

U.S. PATENT DOCUMENTS

| | | | | |
|---|---|---|---|---|
| 6,473,775 B1 * | 10/2002 | Kusters | ................ | G06F 3/0608 707/649 |
| 6,889,228 B1 * | 5/2005 | Federwisch | ......... | G06F 11/2058 |
| 7,043,504 B1 * | 5/2006 | Moore | ................ | G06F 11/1471 |
| 7,702,866 B2 | 4/2010 | Beardsley et al. | | |
| 7,953,946 B2 | 5/2011 | Anand et al. | | |
| 8,220,053 B1 * | 7/2012 | Sun | ....................... | G06F 21/562 726/24 |
| 8,904,130 B2 * | 12/2014 | Hutchison | ........... | G06F 11/1458 711/162 |
| 8,977,826 B1 | 3/2015 | Meiri et al. | | |
| 2004/0167898 A1 * | 8/2004 | Margolus | .......... | G06F 17/30368 |
| 2005/0240584 A1 * | 10/2005 | Patterson | .......... | G06F 17/30067 |
| 2007/0006018 A1 * | 1/2007 | Thompson | .......... | G06F 11/1466 714/6.12 |

(Continued)

OTHER PUBLICATIONS

Gear, Gavin. "Windows 8 Task Manager In-Depth". Published Nov. 7, 2014. <https://blogs.windows.com/windowsexperience/2013/06/06/windows-8-task-manager-in-depth/>. (Year: 2014).*

(Continued)

*Primary Examiner* — Charles Rones
*Assistant Examiner* — Hewy H Li
(74) *Attorney, Agent, or Firm* — Nelson and Nelson; Daniel P. Nelson; Alexis V. Nelson (57) ABSTRACT

A method for preventing data loss in target volumes of copy service functions is disclosed. In one embodiment, such a method includes detecting a copy service function that copies data from a source volume to a target volume. The method automatically creates, in a different address space than the source volume and target volume, a shadow volume to receive data overwritten on the target volume. The method further automatically establishes a point-in-time copy relationship between the target volume and the shadow volume to preserve data on the target volume as writes are received thereto. A corresponding system and computer program product are also disclosed.

20 Claims, 7 Drawing Sheets

(56) References Cited

U.S. PATENT DOCUMENTS

| | | | | |
|---|---|---|---|---|
| 2007/0112866 A1* | 5/2007 | Olson-Williams | ............................ | |
| | | | G06F 17/30312 | |
| 2010/0235597 A1* | 9/2010 | Arakawa | ............... G06F 3/0605 | |
| | | | 711/163 | |
| 2015/0378636 A1* | 12/2015 | Yadav | ................... G06F 3/0608 | |
| | | | 711/165 | |
| 2016/0196079 A1* | 7/2016 | Gong | .................... G06F 3/0608 | |
| | | | 711/162 | |

OTHER PUBLICATIONS

Wcurtispreston. "Snapshot 101: Copy-on-write vs Redirect-on-write". StorageSwiss. Published Apr. 1, 2016. <https://storageswiss.com/2016/04/01/snapshot101copyonwritevsredirectonwrite/>. (Year: 2016).*

Azagury, Alain, et al. "Point-in-time copy: Yesterday, today and tomorrow." NASA Conference Publication. NASA; 1998, 2002. (Year: 1998).*

* cited by examiner

TARGET VOLUME SHADOW COPY

BACKGROUND

Field of the Invention

This invention relates to systems and methods for preventing data loss in target volumes associated with copy service functions.

Background of the Invention

When a user performs a copy service function such as establishing a FlashCopy or PPRC (Peer-to-Peer-Remote-Copy) relationship between a source volume and a target volume, mistakes may be made such as selecting an incorrect target volume to receive data from the source volume. This may result in original data being overwritten and lost on the target volume. Although a user may back up data before making changes to a target volume, managing thousands or even tens of thousands of volumes can be very difficult and error-prone. Ensuring that volumes are correctly backed up, as well as remembering where backup data is stored and when the backup data is no longer needed, almost inevitably leads to data loss at some point in time. In order to avoid data loss, many administrators choose to simply add storage instead of deleting data. This, unfortunately, results in storing and maintaining large quantities of unused data.

Although various safeguards may be put in place to prevent overwriting data on a target volume, such safeguards are often insufficient. For example, before establishing a FlashCopy or PPRC relationship between a source volume and a target volume, a message may be presented to a user that warns the user that data on the target volume may be overwritten. Although effective if heeded, the reality is that such messages become cumbersome, taken for granted, and frequently ignored. Such messages may also be ineffective in cases where the user believes the target volume does not contain desired data. The result is that a mistake will inevitably occur and desired data will be overwritten and possibly lost.

In view of the foregoing, what are needed are systems and methods to prevent data loss in target volumes used in association with copy service functions. Ideally, such systems and methods will operate in the background without requiring substantial user intervention.

SUMMARY

The invention has been developed in response to the present state of the art and, in particular, in response to the problems and needs in the art that have not yet been fully solved by currently available systems and methods. Accordingly, systems and methods are disclosed to prevent data loss in target volumes associated with copy service functions. The features and advantages of the invention will become more fully apparent from the following description and appended claims, or may be learned by practice of the invention as set forth hereinafter.

Consistent with the foregoing, a method for preventing data loss in target volumes of copy service functions is disclosed. In one embodiment, such a method includes detecting a copy service function that copies data from a source volume to a target volume. The method automatically creates, in a different address space than the source volume and target volume, a shadow volume to receive data overwritten on the target volume. The method further automatically establishes a point-in-time copy relationship between the target volume and the shadow volume to preserve data on the target volume as writes are received thereto.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
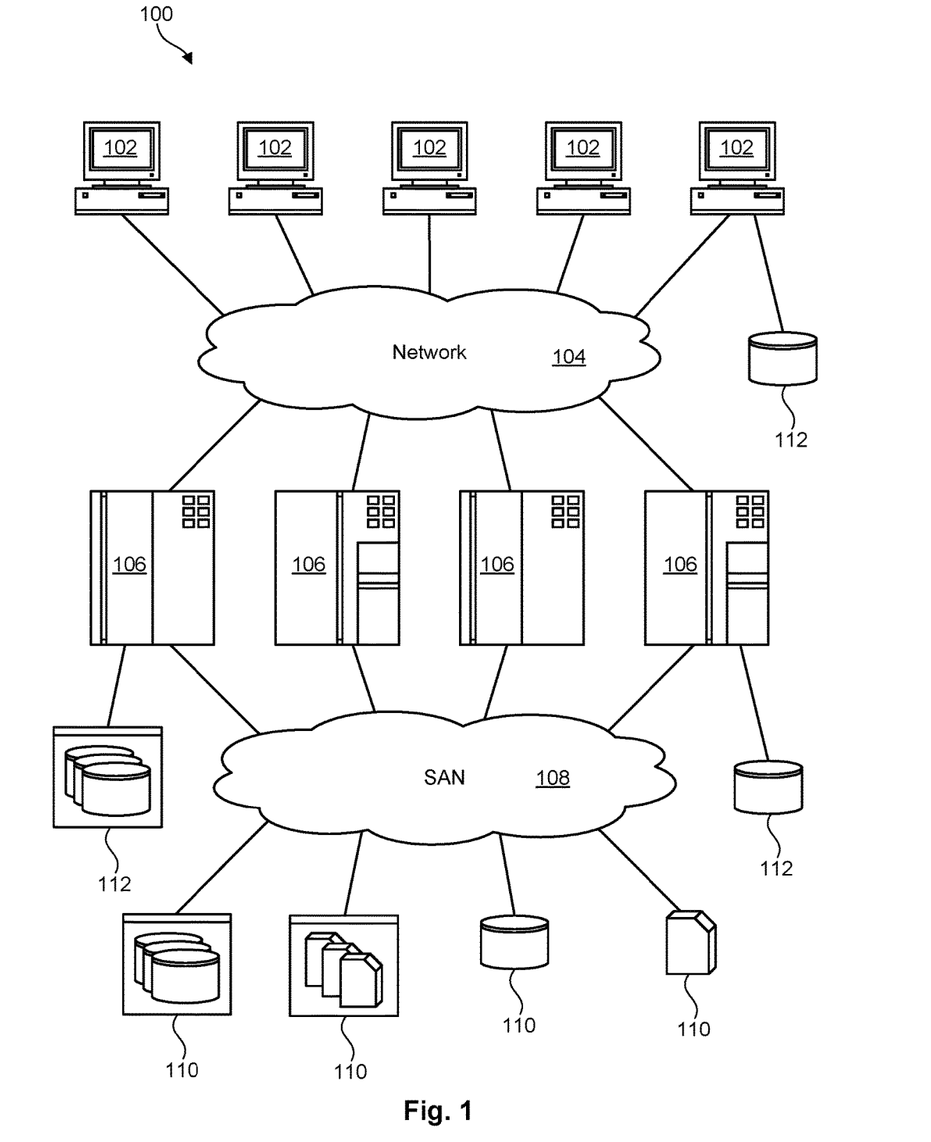
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays of hard-disk drives or solid-state drives, tape libraries, individual hard-disk drives or solid-state drives, tape drives, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
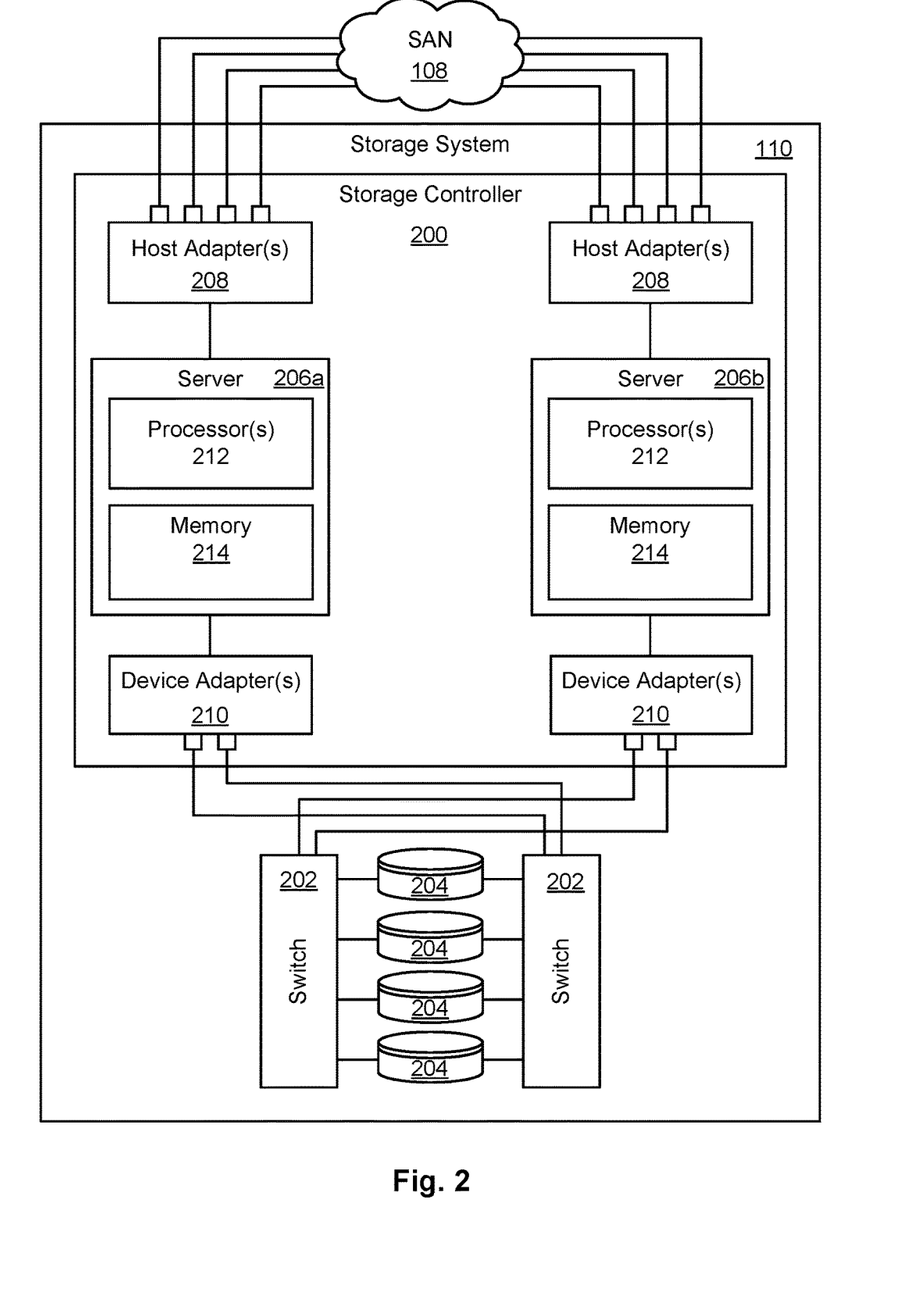
FIG. 2 is a high-level block diagram showing one example of a storage system that may host one or more logical volumes.

Referring to FIG. 2, one embodiment of a storage system 110 containing an array of hard-disk drives 204 and/or solid-state drives 204 is illustrated. The internal components of the storage system 110 are shown since one or more logical volumes may be implemented within such a storage system 110. As shown, the storage system 110 includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
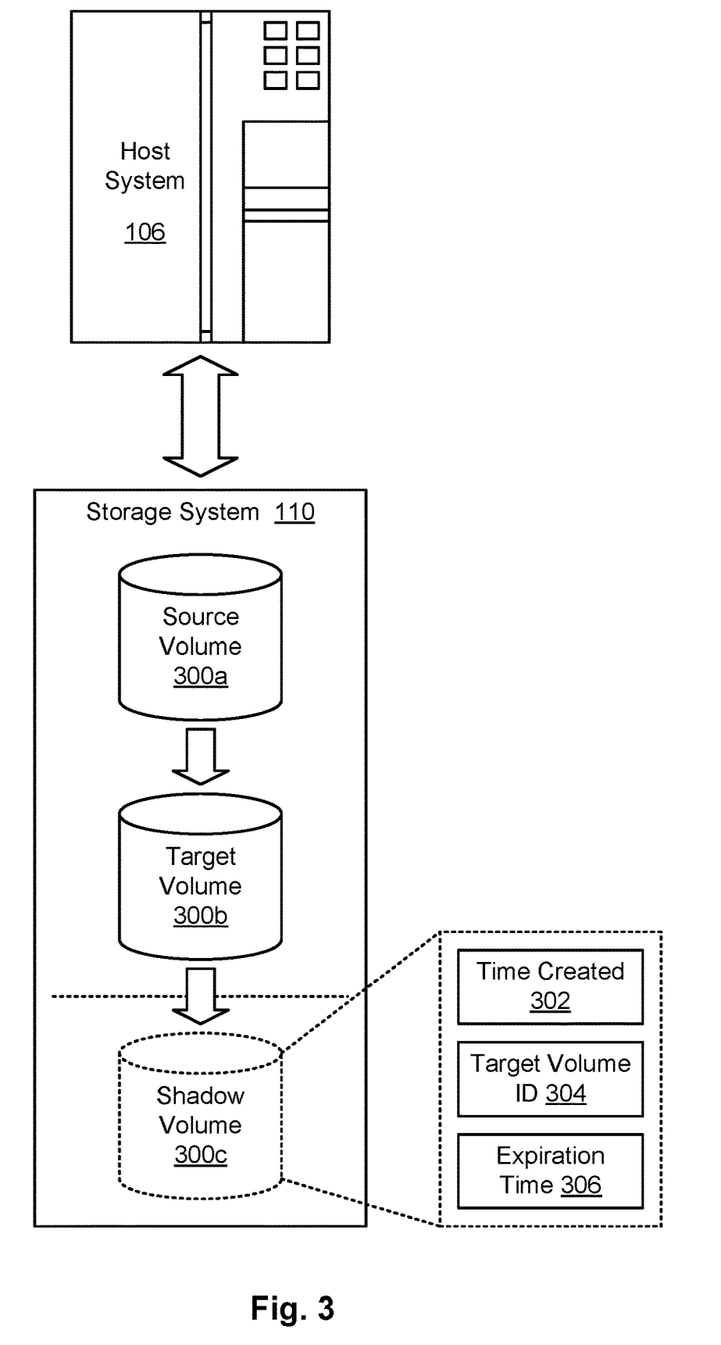
FIG. 3 is a high-level block diagram showing creation of a shadow volume when a point-in-time-copy relationship is established between a source volume and a target volume.

Referring to FIG. 3, as previously mentioned, when a user performs a copy service function such as establishing a FlashCopy or PPRC (Peer-to-Peer-Remote-Copy) relationship between a source volume and a target volume, mistakes may be made such as selecting an incorrect target volume to receive data from the source volume. This may result in original data on the target volume being overwritten and possibly lost if not adequately backed up. As a result, more effective systems and methods are needed to prevent data loss in target volumes of copy service functions. Ideally, such systems and methods will operate in the background without requiring substantial user intervention. Such systems and methods will be explained in more detail in association with FIGS. 4 through 7.

FIG. 3 shows a first scenario where a copy service function is used to create a point-in-time-copy relationship (e.g., a FlashCopy relationship) between a source volume 300a and target volume 300b. In such a scenario, the target volume 300b will contain a logical point-in-time copy of data in the source volume 300a at a designated time. Once this point-in-time-copy relationship is established, data may be read from either the source volume 300a or target volume 300b. Each time a write comes in to the source volume 300a, data that is being overwritten on the source volume 300a may be written to the target volume 300b, thereby preserving data associated with the point-in-time copy. A target bit map associated with a target volume 300b may keep track of which data tracks have actually been copied from the source volume 300a to the target volume 300b. In such a scenario, if the wrong target volume 300b is selected and the target volume 300b contains valuable data, each write to the target volume 300b may overwrite the data, possibly resulting in irreversible data loss.

In order to prevent data loss in the scenario presented above, systems and methods in accordance with the invention may automatically generate a shadow volume 300c on the storage system 110 each time a copy service function establishes a point-in-time-copy relationship between a source volume 300a and a target volume 300b. This shadow volume 300c may contain a point-in-time copy of data in the target volume 300b at the time the point-in-time-copy relationship was established between the source volume 300a and target volume 300b. When original data is overwritten on the target volume 300b, the original data may be stored in the shadow volume 300c, thereby preserving the point-in-time copy. If the target volume 300b is later discovered to have been selected in error as a recipient of data from the source volume 300a, or data in the target volume 300b was undesirably overwritten, data in the shadow volume 300c may be restored to the target volume 300b. In this way, data in a target volume 300b at the time a point-in-time-copy relationship is created may be preserved and data loss may be prevented.

As shown in FIG. 3, when a shadow volume 300c is created, various types of information may be stored in association with the shadow volume 300c or in association with a point-in-time-copy relationship created between the target volume 300b and the shadow volume 300c. This information may include, for example, the time 302 a shadow volume 300c and/or point-in-time copy associated with the shadow volume 300c was created, the identify 304 of the target volume 300b that the shadow volume 300c is associated with, and the expiration time 306 of the shadow volume 300c. The expiration time 306 may indicate how long the shadow volume 300c should be maintained before being deleted. In certain embodiments, a default expiration time 306 such as twenty-four hours may be selected for the shadow volume 300c, although this default value may in certain embodiments be modified by a user.

Figure 4:
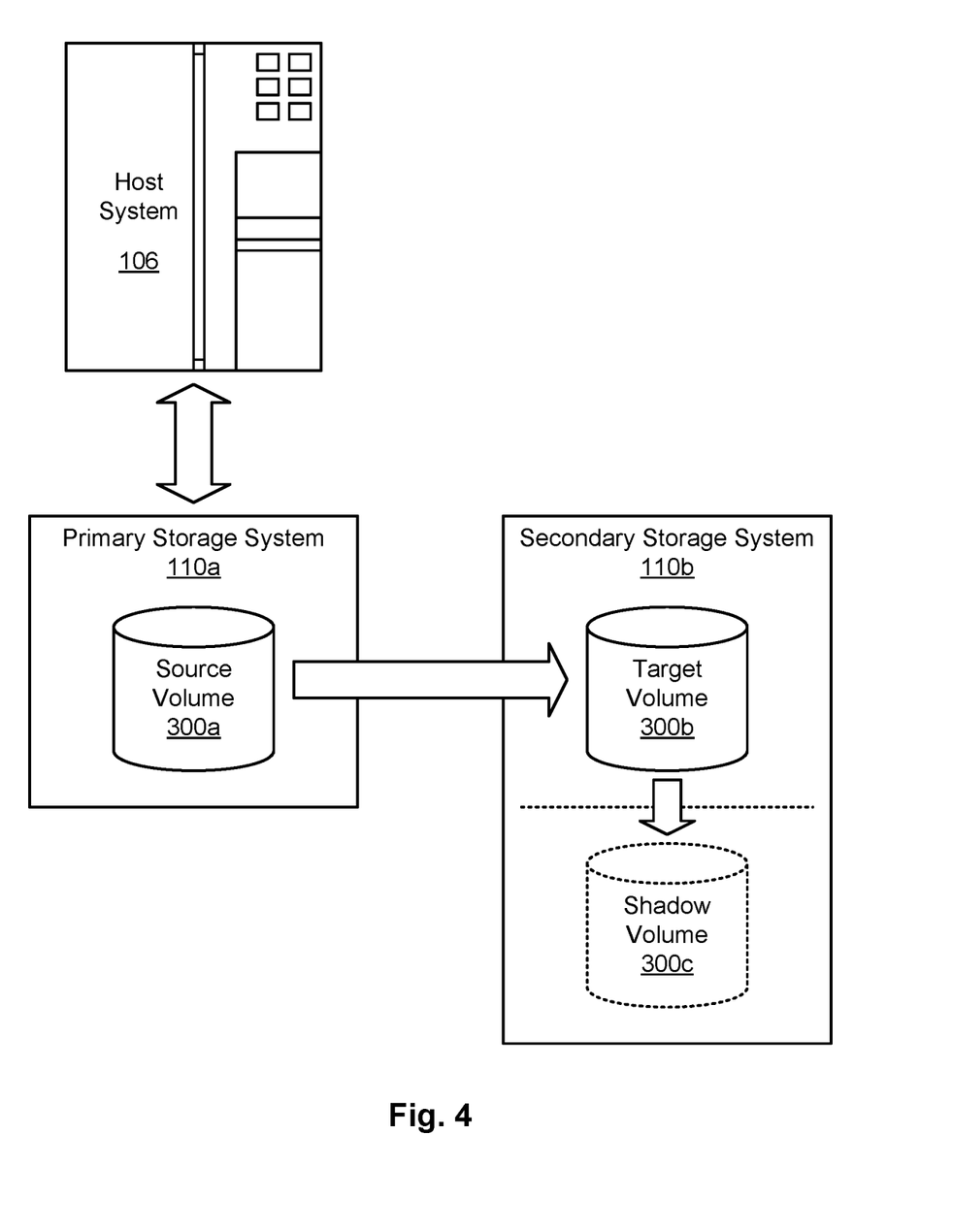
FIG. 4 is a high-level block diagram showing creation of a shadow volume when a peer-to-peer-remote-copy (PPRC) relationship is established between a source volume and a target volume.

Referring to FIG. 4, a second scenario is shown wherein a copy service function is used to create a peer-to-peer-remote-copy (PPRC) relationship between a source volume 300a and a target volume 300b. In such a scenario, the source volume 300a and target volume 300b may reside on different storage systems 110a, 110b although this not necessary in all embodiments. Data may be synchronously mirrored from the source volume 300a to the target volume 300b to maintain two consistent copies of data. As shown, when a PPRC relationship is created, systems and methods in accordance with the invention may automatically create a shadow volume 300c that maintains a point-in-time copy of data in the target volume 300b at the time the PPRC relationship was generated. This will ensure that data on the target volume 300b is preserved in the event the target volume 300b was mistakenly selected to receive data from the source volume 300a, or the target volume 300b contained data that was accidentally overwritten. In the event such a mistake or accident occurs, the shadow volume 300c may be used to restore data that existed at the time the PPRC relationship was established to the target volume 300b.

Figure 5:
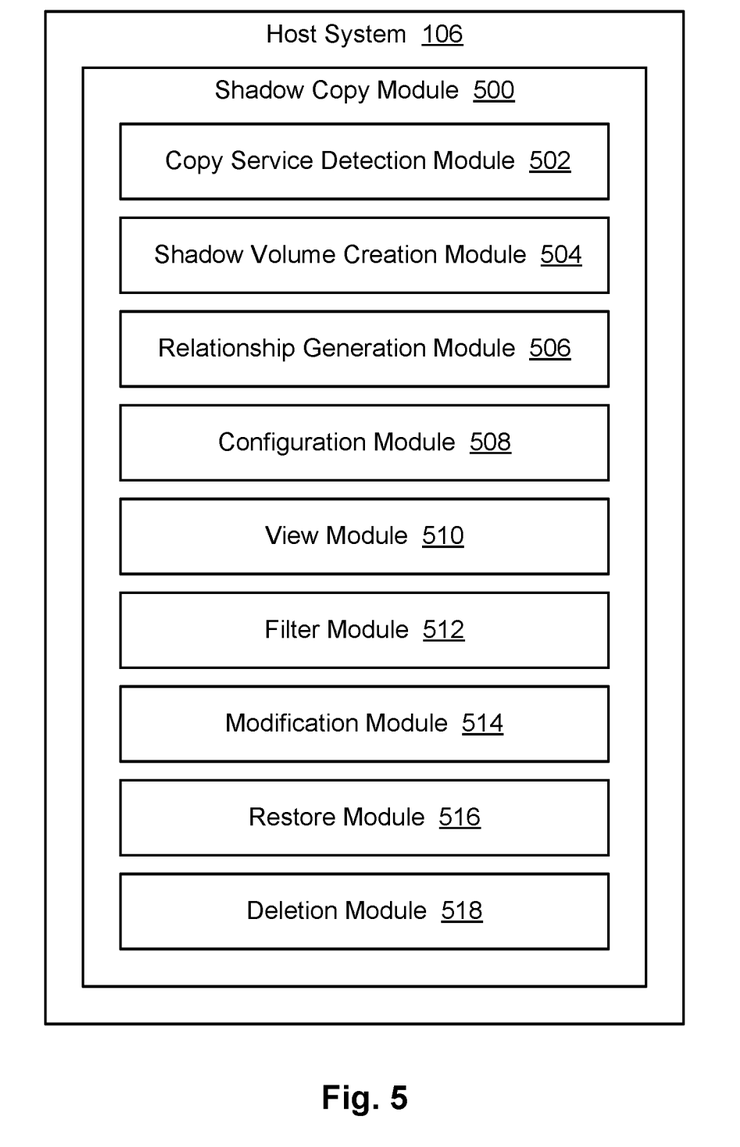
FIG. 5 shows a shadow copy module and associated sub-modules that may be used to implement various features and function of the invention.

Referring to FIG. 5, in order to implement the functionality described above, a shadow copy module 500 may be provided on a host system 106 or other accessing system. This shadow copy module 500 may include various sub-modules to provide various features and functions. These sub-modules may include one or more of a copy service detection module 502, shadow volume creation module 504, relationship generation module 506, configuration module 508, view module 510, filter module 512, modification module 514, restore module 516, and deletion module 518. The shadow copy module 500 and associated sub-modules may be implemented in hardware, software, firmware, or combinations thereof. The sub-modules are presented by way of example and are not intended to represent an exhaustive list of sub-modules that may be included in or associated with the shadow copy module 500. The shadow copy module 500 may include more or fewer sub-modules than those illustrated, or the functionality of the sub-modules may be organized differently.

The copy service detection module 502 may be configured to detect when a target volume 300b is selected in association with a copy service function, such as a copy service function that establishes a point-in-time-copy or PPRC relationship between a source volume 300a and target volume 300b. When a target volume 300b is selected in association with a copy service function, the shadow volume creation module 504 may automatically create a shadow volume 300c that stores a point-in-time copy of data in the target volume 300b. In certain embodiments, the shadow volume 300c may be created in the same extent pool as the target volume 300b. The shadow volume creation module 504 may also, in certain embodiments, create the shadow volume 300c in a different address space than the source volume 300a and target volume 300b to avoid limiting logical addresses that are available to a user. The relationship generation module 506 may establish a point-in-time-copy relationship between the target volume 300b and shadow volume 300c to preserve the point-in-time copy as writes are made to the target volume 300b.

The configuration module 508 may configure the shadow volume 300c and the point-in-time-copy relationship between the target volume 300b and shadow volume 300c. For example, the configuration module 508 may configure the shadow volume 300c as a thin-provisioned volume so that storage space is only allocated to the shadow volume 300c on an as-need basis. In the event the point-in-time-copy relationship is a FlashCopy relationship, the configuration module 508 may enable change recording (allowing rapid restoration of data form the shadow volume 300c to the target volume 300b), disable background copy (preventing the entire target volume 300b from being copied to the shadow volume 300c), and enable target write inhibit (preventing the shadow volume 300c from being directly written to by a host system 106 or other system) to minimize storage capacity used by the shadow volume 300c. The configuration module 508 may also configure, or enable a user to configure, the expiration time 306 associated with the shadow volume 300c.

The view module 510 may enable a user to view possible undo actions for target volumes 300b in point-in-time copy or PPRC relationships. Specifically, for a collection of shadow volumes 300c, the view module 510 may return one or more of the original volume ID (i.e., target volume identifier 304) stored in association with the shadow volume 300c, a timestamp 302 indicating when the shadow volume 300c was created (this timestamp 302 may be stored in association with the point-in-time-copy relationship between the target volume 300b and shadow volume 300c), and expiration time 306 stored in association with the shadow volume 300c. Selecting an undo action may invoke the restore module 516 to, using data in a shadow volume 300c, restore a target volume 300b to a state it was in prior to receiving data from a source volume 300a.

When a user wishes to view point-in-time copy or PPRC relationships on a storage system 110 or group of storage systems 110, the filter module 512 may filter out point-in-time-copy relationships with shadow volumes 300c. This allows point-in-time-copy relationships associated with shadow volumes 300c to be hidden from view, or at least segregated or isolated within a different view, and not clutter up a presentation of conventional point-in-time copy or PPRC relationships.

The modification module 514 may enable a user to modify configuration parameters such as the expiration time 306 associated with a shadow volume 300c. In certain embodiments, a user may perform a modify operation by specifying a target volume identifier 304 and timestamp 302 when a point-in-time copy was created. Using this information, a shadow volume 300c containing backup data may be quickly identified. The modification module 514 may then enable the user to update configuration parameters such as the expiration time 306 associated with the shadow volume 300c.

The deletion module 518 may delete a shadow volume 300c in response to various conditions or actions. As will be explained in more detail in association FIG. 7, various conditions or actions may initiate automatic deletion of a shadow volume 300c. These may include, for example, restoration of data from a shadow volume 300c to a target volume 300b, expiration of a shadow volume 300c in accordance with its expiration time 306, deleting a target volume 300b associated with a shadow volume 300c, resizing a target volume 300b associated with a shadow volume 300c, and/or a need for storage space that may be satisfied by reclaiming storage space associated with a shadow volume 300c. Any or all of these actions may cause automatic deletion of a shadow volume 300c.

Figure 6:
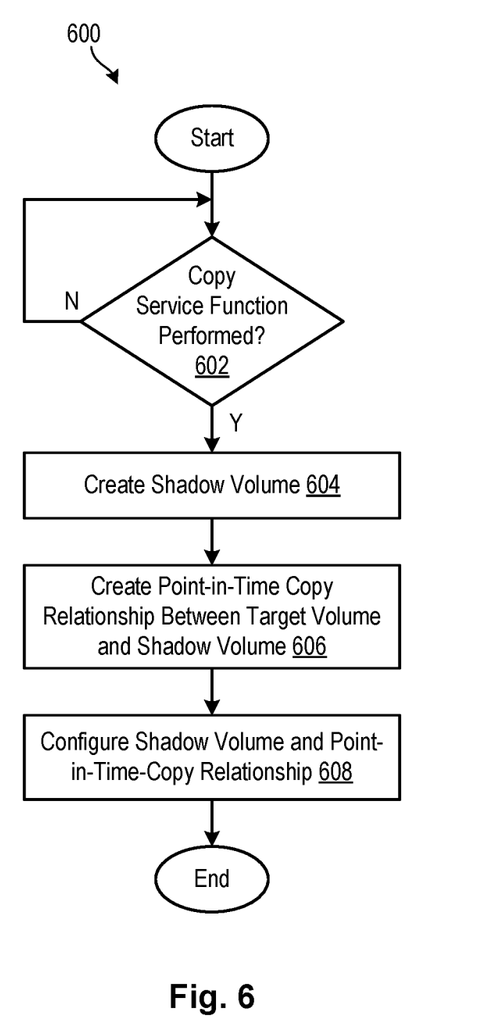
FIG. 6 is a process flow diagram showing one embodiment of a method for establishing a shadow volume.

Referring to FIG. 6, one embodiment of a method 600 for establishing a shadow volume 300c is illustrated. As shown, the method 600 initially determines 602 whether a copy service function has been performed that requires selection of a target volume 300b to receive data from a source volume 300a. If so, the method 600 creates 604 a shadow volume 300c to store a point-in-time copy of data in the target volume 300b. The method 600 further creates 606 a point-in-time-copy relationship between the target volume 300b and the shadow volume 300c to preserve data associated with the point-in-time copy as writes are made to the target volume 300b.

The method 600 configures 608 the shadow volume 300c and point-in-time-copy relationship between the target volume 300b and shadow volume 300c. For example, the method 600 may configure the shadow volume 300c as a thin-provisioned volume to reduce or minimize an amount of storage space used by the shadow volume 300c. The method 600 may also store, in association with the point-in-time-copy relationship between the target volume 300b and shadow volume 300c, the time 302 when the shadow volume 300c was created. The method 600 may also store, in the shadow volume 300c or in metadata associated with the shadow volume 300c, the identify 304 of the target volume 300b that is associated with the shadow volume 300c and the expiration time 306 of the shadow volume 300c. In the event the point-in-time-copy relationship between the target volume 300b and shadow volume 300c is a FlashCopy relationship, the method 600 may configure 608 the FlashCopy relationship by enabling change recording, disabling background copy, and enabling target write inhibit to reduce or minimize storage capacity used by the shadow volume 300c.

Figure 7:
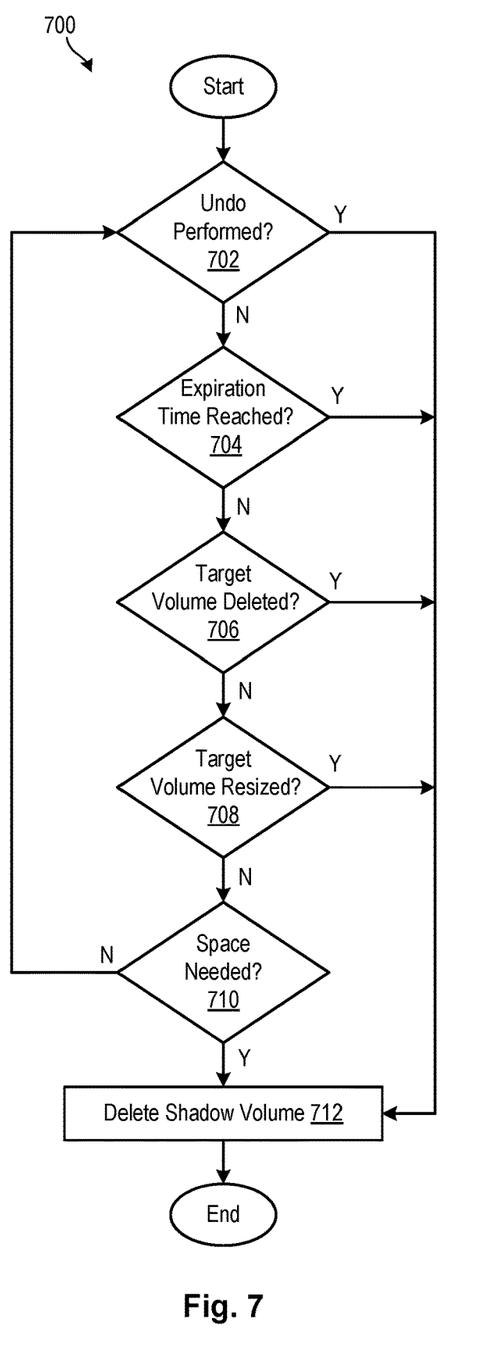
FIG. 7 is a process flow diagram showing one embodiment of a method for determining when to delete a shadow volume.

Referring to FIG. 7, one embodiment of a method 700 to determine when to delete a shadow volume 300c is illustrated. As shown in FIG. 7, various actions or conditions may precipitate the deletion of a shadow volume 300c as well as the point-in-time-copy relationship between the target volume 300b and the shadow volume 300c. These may include, for example, performing 702 an undo operation wherein data is restored from a shadow volume 300c to a target volume 300b. Once an undo operation is performed, the shadow volume 300c is no longer needed and therefore may be deleted at step 712.

The method 700 may also determine 704 whether the expiration time 306 associated with a shadow volume 300c has been reached. In certain embodiments, a process on the storage system 110 or host system 106 may periodically poll a list of shadow volumes 300c to compare a current time with the time the shadow volumes 300c were established. Each shadow volume 300c still in existence after its designated expiration time 306 may be deleted at step 712.

The method 700 may also determine 706 whether a target volume 300b associated with a shadow volume 300c has been deleted. Upon receiving a request to delete a target volume 300b, a query may be performed for any associated shadow volume 300c. If a shadow volume 300c is discovered, the method 700 may delete 712 the shadow volume 300c since it is no longer needed.

The method 700 may also determine 708 whether a target volume 300b is resized. Most storage systems 110 do not allow volumes that participate in point-in-time-copy relationships with other volumes to be resized. Thus, when a volume is resized, its point-in-time-copy relationship with another volume may be terminated. Upon receiving a request to resize a target volume 300b, a query may be performed for any associated shadow volume 300c. If a shadow volume 300c is discovered, the method 700 may delete 712 the shadow volume 300c since it is no longer needed.

The method 700 may also determine 710 if storage space needs to be reclaimed on a storage system 110. If a user or system performs an action (e.g., the user creates a volume or I/O is performed on a thin-provisioned volume that requires allocating additional storage space to the thin-provisioned volume), and this action fails due to insufficient storage capacity on a storage system 110, the method 700 may delete the oldest shadow volumes 300c on the storage system 110 in order to allow the action to execute or retry successfully. In certain embodiments, a user may be notified when shadow volumes 300c are deleted prior to their designated expiration times 306.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for preventing data loss in target volumes of copy service functions, the method comprising:
   detecting a copy service function that copies data from a source volume to a target volume; and
   automatically performing the following in response to detecting the copy service function:
      creating a shadow volume to receive data overwritten on the target volume; and
      establishing a point-in-time copy relationship between the target volume and the shadow volume to preserve data on the target volume as writes are received thereto.

2. The method of claim 1, further comprising automatically deleting the shadow volume after a designated expiration time.

3. The method of claim 2, further comprising storing, in association with the shadow volume, the expiration time.

4. The method of claim 1, further comprising automatically deleting the shadow volume in response to deletion of the target volume.

5. The method of claim 1, further comprising storing, in association with the shadow volume, the target volume to which the shadow volume corresponds.

6. The method of claim 1, wherein the shadow volume is a thin-provisioned volume.

7. The method of claim 1, further comprising automatically deleting the shadow volume upon restoring data from the shadow volume to the target volume.

8. A computer program product for preventing data loss in target volumes of copy service functions, the computer program product comprising a computer-readable storage medium having computer-usable program code embodied therein, the computer-usable program code configured to perform the following when executed by at least one processor:
   detect a copy service function that copies data from a source volume to a target volume; and
   automatically perform the following in response to detecting the copy service function:
      create, a shadow volume to receive data overwritten on the target volume; and
      establish a point-in-time copy relationship between the target volume and the shadow volume to preserve data on the target volume as writes are received thereto.

9. The computer program product of claim 8, wherein the computer-usable program code is further configured to automatically delete the shadow volume after a designated expiration time.

10. The computer program product of claim 9, wherein the computer-usable program code is further configured to store, in association with the shadow volume, the expiration time.

11. The computer program product of claim 8, wherein the computer-usable program code is further configured to automatically delete the shadow volume in response to deletion of the target volume.

12. The computer program product of claim 8, wherein the computer-usable program code is further configured to store, in association with the shadow volume, the target volume to which the shadow volume corresponds.

13. The computer program product of claim 8, wherein the shadow volume is a thin-provisioned volume.

14. The computer program product of claim 8, wherein the computer-usable program code is further configured to automatically delete the shadow volume upon restoring data from the shadow volume to the target volume.

15. A system for preventing data loss in target volumes of copy service functions, the system comprising:
   at least one processor;
   at least one memory device operably coupled to the at least one processor and storing instructions for execution on the at least one processor, the instructions causing the at least one processor to:
      detect a copy service function that copies data from a source volume to a target volume; and
      automatically perform the following in response to detecting the copy service function:
         create, a shadow volume to receive data overwritten on the target volume; and
         establish a point-in-time copy relationship between the target volume and the shadow volume to preserve data on the target volume as writes are received thereto.

16. The system of claim 15, wherein the instructions further cause the at least one processor to automatically delete the shadow volume after a designated expiration time.

17. The system of claim 16, wherein the instructions further cause the at least one processor to store, in association with the shadow volume, the expiration time.

18. The system of claim 15, wherein the instructions further cause the at least one processor to automatically delete the shadow volume in response to deletion of the target volume.

19. The system of claim 15, wherein the shadow volume is a thin-provisioned volume.

20. The system of claim 15, wherein the instructions further cause the at least one processor to automatically delete the shadow volume upon restoring data from the shadow volume to the target volume.

* * * * *